United States Patent
Hasegawa et al.

(10) Patent No.: US 7,374,007 B2
(45) Date of Patent: May 20, 2008

(54) WHEELED VEHICLE WITH LEG SHIELD

(75) Inventors: Hirofumi Hasegawa, Shizuoka (JP); Toshihiko Konno, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 13 days.

(21) Appl. No.: 11/130,908

(22) Filed: May 17, 2005

(65) Prior Publication Data

US 2006/0021814 A1    Feb. 2, 2006

(30) Foreign Application Priority Data

Jul. 27, 2004    (JP) .............................. 2004-218577

(51) Int. Cl.
*B62J 17/00* (2006.01)
*B62J 17/02* (2006.01)

(52) U.S. Cl. .................. 180/219; 296/78.1; 280/152.1; 280/152.2; 280/152.3; 280/851; 280/291

(58) Field of Classification Search ................. 180/219
See application file for complete search history.

(56) References Cited

U.S. PATENT DOCUMENTS

| | | | | |
|---|---|---|---|---|
| 4,726,439 A | * | 2/1988 | Iwao et al. ................. | 180/219 |
| 5,094,315 A | * | 3/1992 | Taki et al. ................... | 180/219 |
| 6,588,529 B2 | * | 7/2003 | Ishii et al. ................... | 180/219 |
| 2002/0166709 A1 | * | 11/2002 | Michisaka et al. .......... | 180/219 |
| 2002/0189877 A1 | * | 12/2002 | Yagisawa et al. ............ | 180/219 |

FOREIGN PATENT DOCUMENTS

JP        2794485        9/1998

* cited by examiner

*Primary Examiner*—Lesley D. Morris
*Assistant Examiner*—Marlon Arce-Diaz
(74) *Attorney, Agent, or Firm*—Keating & Bennett, LLP

(57) ABSTRACT

A wheeled vehicle includes front and rear wheels. A frame supports the front and rear wheels. A leg shield shields legs of a rider. A portion of the frame extends in front of the leg shield. The leg shield has a forward end and a rear end. The rear end is positioned generally at a height of the forward end. The leg shield has first and second portions and at least one third portion. The first portion generally extends upward and rearward from the forward end. The second portion generally extends downward and rearward from the forward end. The third portion generally extends upward from the second portion. The third portion defines a pocket at least together with the first or second portion. The third portion is positioned generally farther forward than the rear end or positioned adjacent to the rear end in the rear of the rear end.

17 Claims, 8 Drawing Sheets

WHEELED VEHICLE WITH LEG SHIELD

PRIORITY INFORMATION

The present application is based on and claims priority under 35 U.S.C. § 119 to Japanese Patent Application No. 2004-218577, filed on Jul. 27, 2004, the entire contents of which are expressly incorporated by reference herein.

BACKGROUND OF THE INVENTION

1. Field of the Invention

The present invention relates to a wheeled vehicle including a leg shield, and more particularly to a wheeled vehicle including a leg shield having a pocket.

2. Description of Related Art

Wheeled vehicles such as, for example, scooters and mopeds typically include a frame that supports front and rear wheels, an engine unit, a seat and other components. The frame typically is covered with multiple covers. The covers include a leg shield that shields the legs of a rider. The leg shield is disposed in front of the seat and behind a steering shaft.

The leg shield may include a pocket or inner rack on a surface that faces the rider. For example, Japanese Patent No. 2794485 discloses such a pocket. The rider may store relatively small articles in the pocket.

The pocket, however, may protrude rearward and adversely affect the appearance of the vehicle. The protrusion of the pocket also may interfere with the rider mounting or dismounting the wheeled vehicle. In addition, the knees of the rider may abut against the pocket if the rider is a relatively large person. A smaller pocket does not have such drawbacks. However, the capacity for receiving articles is limited.

SUMMARY OF THE INVENTION

To overcome the problems described above, preferred embodiments of the present invention provide a wheeled vehicle including a leg shield having a pocket, the pocket having a relatively large capacity without adversely affecting the appearance of the vehicle or interfering with a rider of the vehicle.

A preferred embodiment of the present invention provides a wheeled vehicle including front and rear wheels. A frame is provided to support the front and rear wheels. A leg shield is provided to shield the legs of a rider. A portion of the frame extends in front of the leg shield. The leg shield includes a forward end and a rear end. The rear end is located at substantially the same height as the forward end. The leg shield includes a first portion extending upward and rearward from the forward end. A second portion extends downward and rearward from the forward end. At least one third portion extends upward from the second portion. The third portion defines a pocket together with at least one of the first and second portions. The third portion is located farther forward than the rear end or is located adjacent to the rear end.

In accordance with another preferred embodiment of the present invention, a wheeled vehicle includes front and rear wheels. A frame is arranged to support the front and rear wheels. A leg shield is provided to shield the legs of a rider. A portion of the frame extends in front of the leg shield. The leg shield includes a curved portion that projects forward. The leg shield defines a pocket on a backside which is opposite to a front side facing the portion of the frame. The pocket opens upwardly at approximately the height of the curved portion.

These and other features, elements, characteristics and advantages of the present invention will become more apparent from the following detailed description of preferred embodiments of the present invention with reference to the attached drawings.

DETAILED DESCRIPTION OF PREFERRED EMBODIMENTS

With reference to FIGS. 1-4, an overall construction of a moped 30 configured in accordance with a preferred embodiment of the present invention is described. The moped 30 merely exemplifies one type of a wheeled vehicle. A leg shield structure with a pocket described below may be applied for other types of wheeled vehicles such as, for example, scooters. Such applications will be apparent to those of ordinary skill in the art in light of the description herein.

As used throughout this description, the terms "forward" and "front" mean at or to the side where the leading end of the moped 30 is provided, and the terms "rear" and "rearward" mean at or to the opposite side of the front side, unless indicated otherwise or otherwise readily apparent from the context used. Also, as used in this description, the term "horizontally" means that the subject portions, members or components extend substantially parallel to the ground when the moped 30 is upright. The term "vertically" means that portions, members or components extend substantially perpendicular to those that extend horizontally.

Figure 1:
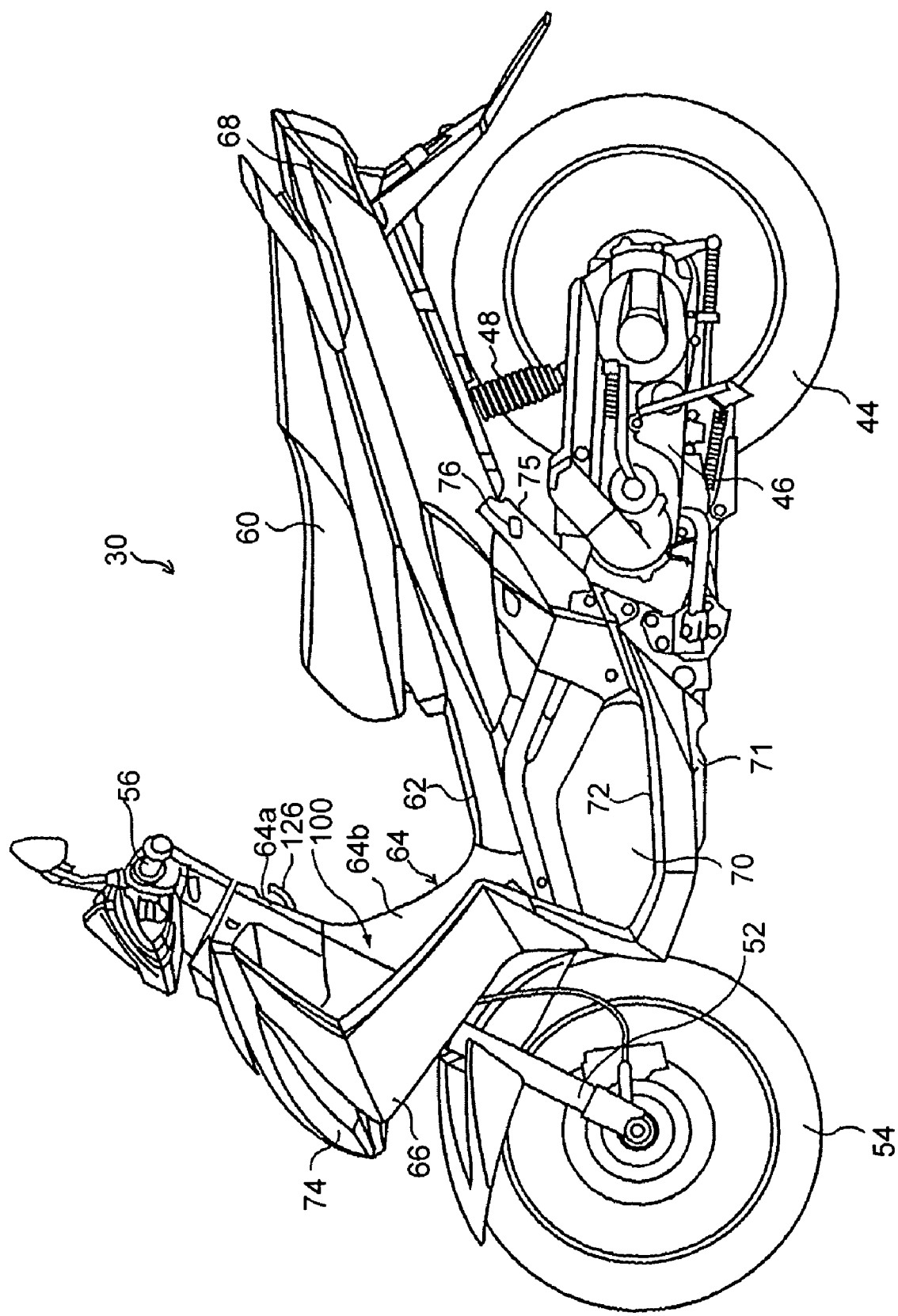
FIG. 1 illustrates a side elevation view of a moped configured in accordance with a preferred embodiment of the present invention.
Figure 2:
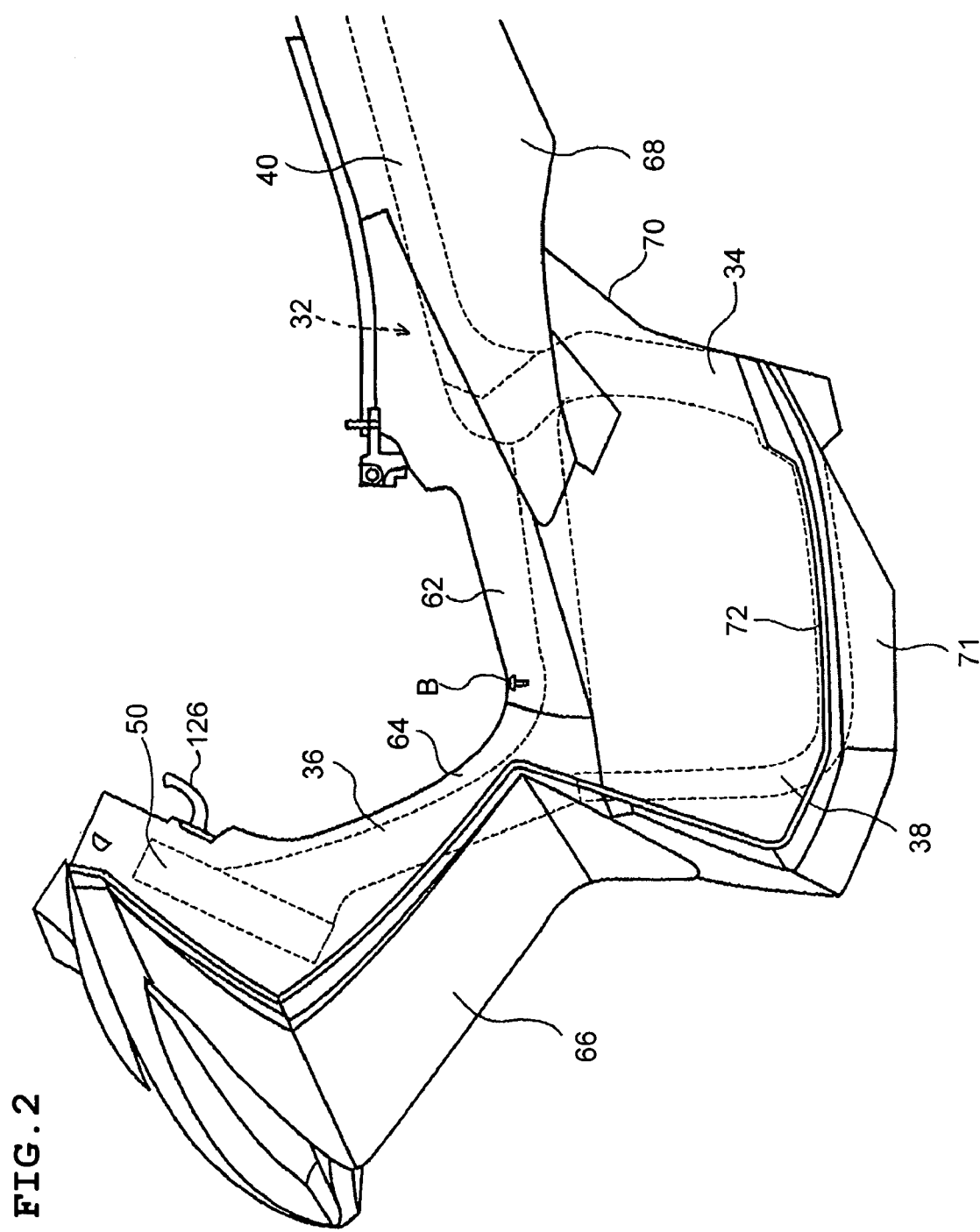
FIG. 2 illustrates a side elevation view of a major portion of the moped of FIG. 1, with a frame of the moped is shown in phantom.

With reference to FIGS. 1 and 2, the moped 30 has a frame 32 that defines a base of the moped 30. The frame 32 preferably includes a pair of right and left bracket sections 34, a main frame section 36, a sub frame section or downtube 38, a pair of right and left seat rails 40 and several cross bars or cross members.

Both of the bracket sections 34 extend substantially vertically and are connected with each other through the cross bars. The bracket sections 34 support a power unit and a rear wheel 44. In the illustrated preferred embodiment, a combination of an internal combustion engine and a transmission, i.e., an engine unit 46 defines the prime mover. An electric motor, for example, may replace the engine. The rear wheel 44 is preferably a propulsive wheel in the illustrated preferred embodiment, and the engine unit 46 powers the rear wheel 44. A center of the illustrated engine unit 46 is located on a longitudinal center plane LCP (FIG. 3) of the moped 30 that extends vertically and from front to rear when the moped 30 is upright. A rear portion of the engine unit 46, however, is off-set to the left hand side relative to the longitudinal center plane LCP such that the rear wheel 44 and a muffler of an exhaust system for the engine can be disposed in the remaining space.

The engine unit 46 preferably swings up and down or pivots about a swing axis that extends transversely at respective bottom ends of the bracket sections 34. The rear portion of the engine unit 46 preferably accommodates the axle of the rear wheel 44 and is defined by an output shaft of the engine unit 46. Preferably, a suspension 48 extends between the engine unit 46 and the seat rail 40 on the left hand side of the moped 30 to absorb shock.

The main frame section 36 preferably includes a horizontal portion and a vertical portion. The horizontal portion extends forward from a top end of the bracket section 34 on the right hand side toward the longitudinal center plane LCP. The vertical portion extends upward from a forward end of the horizontal section. A head pipe 50 is welded to a top portion of the vertical portion. The head pipe 50 accommodates a steering shaft that included a pair of front forks 52 at its bottom. The axle of a front wheel 54 is interposed between the front forks 52. A handle bar 56 extends generally horizontally from a top portion the steering shaft. The handle bar 56 includes handle grips at respective ends thereof. A rider steers the moped 30 by turning the handle bar 56. The handle bar 56 preferably includes a throttling device that controls the power of the engine, and brake levers that stop the rotation of the front wheel 54 and the rear wheel 44 through braking devices.

The illustrated sub frame section 38 also includes horizontal and vertical portions. The horizontal portion preferably extends forward below the horizontal portion of the main frame section 36. The vertical portion further extends upward toward a bottom of the vertical portion of the main frame section 36 from a forward end of the horizontal section. The vertical portion of the sub frame section 38 is coupled with the vertical portion of the main frame section 36.

The seat rails 40 preferably are connected with each other through the cross bars or cross members. The seat rails 40 support a tandem seat 60. Preferably, the seat 60 is detachably fixed to the frame 32. Two riders can straddle and ride on the seat 60.

The respective bracket sections 34 are transversely spaced apart from each other and seat rails 40 are transversely spaced apart from each other so as to extend substantially symmetrical on both sides of the longitudinal plane LCP. That is, the moped 30 in the illustrated preferred embodiment is substantially symmetrical relative to the longitudinal center plane LCP. These components of the frame 32 are preferably welded together or joined by proper fasteners such as, for example, bolts and nuts.

With continued reference to FIGS. 1-4, multiple covers are provided to cover the frame 32. The covers in the illustrated preferred embodiment include a center cover 62, a leg shield 64, a front cover 66, a pair of right and left side covers 68, a pair of right and left lower covers 70 and a bottom cover 71. A pair of foot boards 72 is provided to support the feet of the rider (driver) who straddles the seat 60 and drives the moped 30.

The center cover 62 extends substantially horizontally along the horizontal portion of the main frame section 36 and front portions of the respective seat rails 40 to cover top surfaces of these portions. A forward half of the center cover 62 extends gradually upward to a rear half thereof where the seat 60 is mounted. Preferably, the rear half of the center cover 62 and the side covers 68 together define an opening. A helmet storage box is preferably disposed below the opening. Thus, the rider can store his or her helmet in the storage box through the opening by removing the seat 60. The helmet storage box is attached to the seat rail 40.

The leg shield 64 preferably extends substantially vertically along the vertical portion of the main frame section 36 to cover a rear surface of the vertical portion. The leg shield 64 opposes the knees of the rider to shield legs of the rider. A front end of the center cover 62 overlaps a rear end of the leg shield 64. In the illustrated preferred embodiment, a fastening structure using a bolt B (FIG. 2) unites the leg shield 64 with the center cover 62 and fastens the leg shield 64 and the center cover 62 to the main frame section 36. An axis of the bolt B is preferably the sole reference position for every cover to be affixed to the frame 32. The leg shield 64 is directly attached to the main frame section 36 at other portions using other bolts.

The front cover 66 preferably extends substantially vertically along the vertical portion of the main frame section 36 to cover a front surface of the vertical portion. That is, the vertical portion of the main frame section 36 is interposed between the leg shield 64 and the front cover 66. The front cover 66 preferably includes a pair of recesses disposed in a forward portion on both sides of the longitudinal center plane LCP. Head lamp assemblies 74 are inserted into the respective recesses to be arranged at the forward-most end of the front cover 66.

The side covers 68 preferably extend substantially horizontally to cover respective side surfaces of the seat rails 40. The lower covers 70 preferably extend substantially vertically below the center cover 62 on both sides of the moped 30 to cover respective side surfaces of the bracket sections 34, the sub frame section 38, a forward portion of the engine unit 46 and components for the engine unit 46 such as, for example, an air cleaner. The bottom cover 71 extends substantially horizontally below the foot boards 72 to cover respective bottom surfaces of the bracket sections 34, the sub frame section 38, the forward portion of the engine unit 46 and other components. The center cover 62, the leg shield 64, the front cover 66, the side covers 68, the lower covers 70 and the bottom cover 71 cover substantially the entire frame 32 of the moped 30.

The covers 62, 64, 66, 68, 70, 71 and the foot board 72 are preferably made of relatively thin resin materials. In the illustrated preferred embodiment, the center cover 62 and a portion of the leg shield 64 are preferably made of PP (poly-propylene) resin, for example, to provide a desired amount of strength. The remaining portion of the leg shield 64, the front cover 66 and the side covers 68 are preferably made of ABS (acrylonitorile-butadiene-styrene) resin, for example, to provide an attractive appearance. This is because the ABS resin can be coated. In general, the PP resin is stronger than the ABS resin.

A pair of right and left stays 75 extends from the bracket sections 34 of the frame 32. Each stay 75 includes a foot rest 76 for another rider who straddles the seat 60 behind the driver. The respective foot rests 76 move between an extended position and a retracted position.

With reference to FIGS. 1-7, the leg shield 64 is described in greater details.

Figure 4:
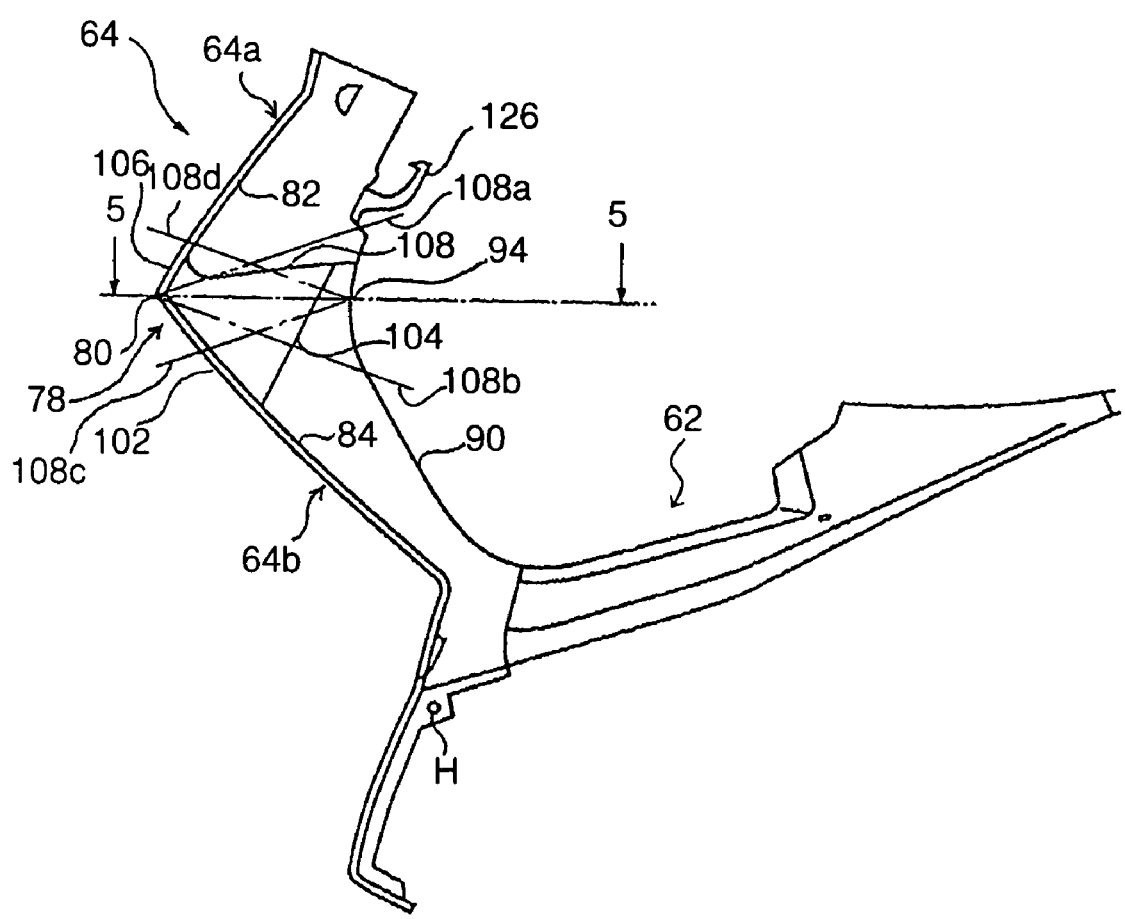
FIG. 4 illustrates a side elevation view of the leg shield and the center cover, with the leg shield and the center cover being coupled together in this figure.
Figure 5:
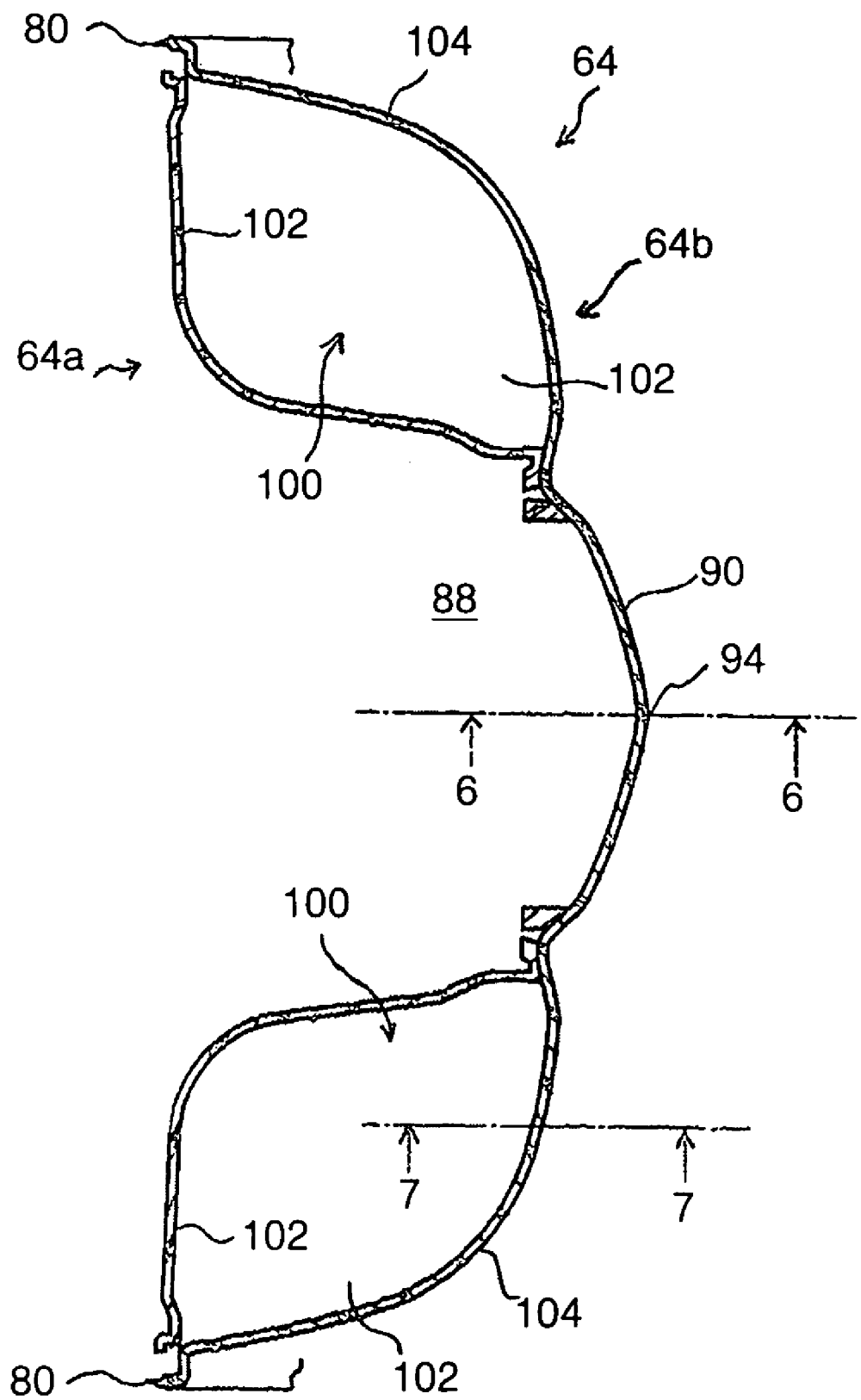
FIG. 5 illustrates a cross-sectional view of the leg shield taken along the line 5-5 of FIG. 4.

As best shown in FIG. 4, the leg shield 64 preferably includes a curved portion 78 that projects forward. In other words, the portion 78 is bent forward similar to an elbow. As best shown in FIGS. 4 and 5, the curved portion 78 preferably defines a pair of forward-most ends 80. In the illustrated preferred embodiment, the forward-most ends 80 are transversely spaced apart from each other to a large degree. A first portion or upper slanting portion 82 extends upward and rearward from the forward-most end 80, while a second portion or lower slanting portion 84 extends downward and rearward from the forward-most end 80. Although the leg shield 64 may be made of one member, the illustrated leg shield 64 includes at least an upper member 64a and a lower member 64b. In the illustrated preferred embodiment, the upper member 64a is preferably made of ABS resin, and the lower member 64b is preferably made of PP resin, for example.

The upper and lower slanting portions 82, 84 preferably define a recess 88 that extends rearward and between a top of the upper slanting portion 82 and a bottom of the lower slanting portion 84. A center of the recess 88 is preferably located substantially on the longitudinal center plane LCP. That is, the recess 88 is defined on a front side that faces the vertical portion of the main frame section 36. Thus, the recess 88 accommodates the vertical portion of the main frame section 36. Because the upper or lower slanting portions 82, 84 are preferably made with a relatively thin resin and the recess 88 is disposed on the front side, the upper and lower slanting portions 82, 84 inevitably protrude rearward to define a swelling portion 90 on a backside of the recess 88. The backside is a rear side that is opposite to the front side. The swelling portion 90 has a ridgeline extending substantially on the longitudinal center plane LCP. A point located on the ridgeline at a height of the forward-most ends 80 defines a rear end 94 (FIGS. 4 and 5).

With continued reference to FIGS. 1-7, the leg shield 64 includes a pair of pockets 100 on both sides of the swelling portion 90. The pockets 100 are preferably disposed symmetrically relative to the longitudinal center plane LCP. In the illustrated preferred embodiment, the upper member 64a defines the upper slanting portion 82 and a portion of the lower slanting portion 84. The portion of the lower slanting portion 84 preferably defines respective bottom walls 102 of the pockets 100. A portion of the upper slanting portion 82 that extends next to the lower slanting portion 84 preferably defines respective forward walls 106 of the pockets 100. Also, the lower member 64b defines the remaining portion of the lower slanting portion 84 and respective rear walls 104 of the pockets 100.

Figure 3:
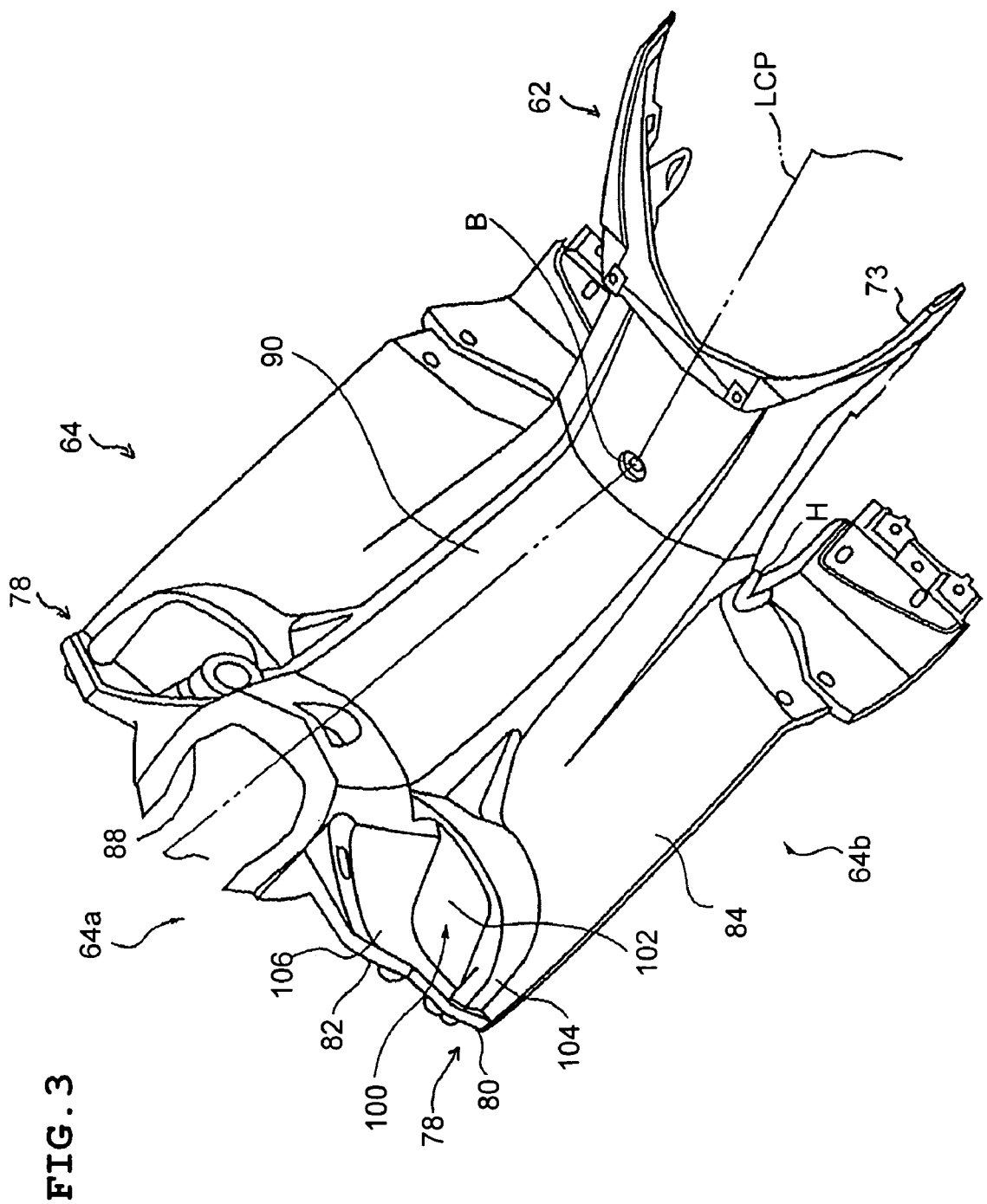
FIG. 3 illustrates a perspective view of a leg shield and a center cover of the moped as seen from a rear left side of the moped, with the leg shield and the center cover being coupled together in this figure.

As best shown in FIGS. 3 and 5, each rear wall 104 extends from each side of the swelling portion 90 toward the forward-most end 80. The rear walls 104 define a third portion of the leg shield 64 in the illustrated preferred embodiment. A mid portion of the rear wall 104 is arcuately curved. Preferably, each rear wall 104 extends upward and rearward from a lower-most end of the bottom wall 102. The illustrated rear wall 104 also extends substantially parallel to the upper slanting portion 82. As best shown in FIG. 3, each forward wall 106 in turn extends from each side of the swelling portion 90 toward the forward-most end 80. A mid portion of each forward wall 106 is arcuately curved to merge with the associated rear wall 104.

Respective top ends of the rear wall 104 and the forward wall 106 together define an opening 108 (FIG. 4) of each pocket 100. The opening 108 is preferably formed such that the entire body of the rear wall 104 is located further forward than the foregoing rear end 94.

The opening 108 preferably extends substantially horizontally. The opening 108 is preferably approximately at a height of the forward-most end 80. The illustrated opening 108 is located slightly higher than the forward-most end 80 and the rear end 94. Alternatively, the opening 108 may be inclined forward or rearward. Also, the opening 108 can be shifted upward or downward. Preferably, the opening 108 is located and inclined within a range between the phantom lines 108a, 108b of FIG. 4 or within a range between the phantom lines 108c, 108d of FIG. 4. The phantom line 108a extends upward and rearward from the forward-most end 80 with at approximately 30 degrees from a horizontal line. The phantom plane 108b extends downward and rearward from the forward-most end 80 at approximately 30 degrees from the horizontal line. The phantom line 108c extends upward and forward from the rear end 94 at approximately 30 degrees from the horizontal line. Also, the phantom line 108d extends downward and forward from the rear end 94 at approximately 30 degrees from the horizontal line.

Figure 6:
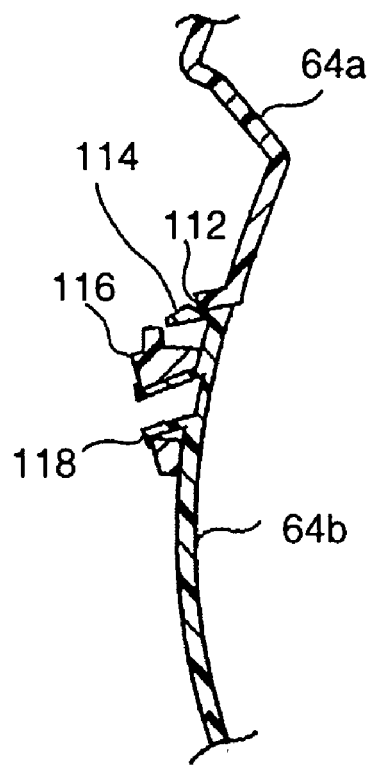
FIG. 6 illustrates a cross-sectional view of the leg shield taken along the line 6-6 of FIG. 5.
Figure 7:
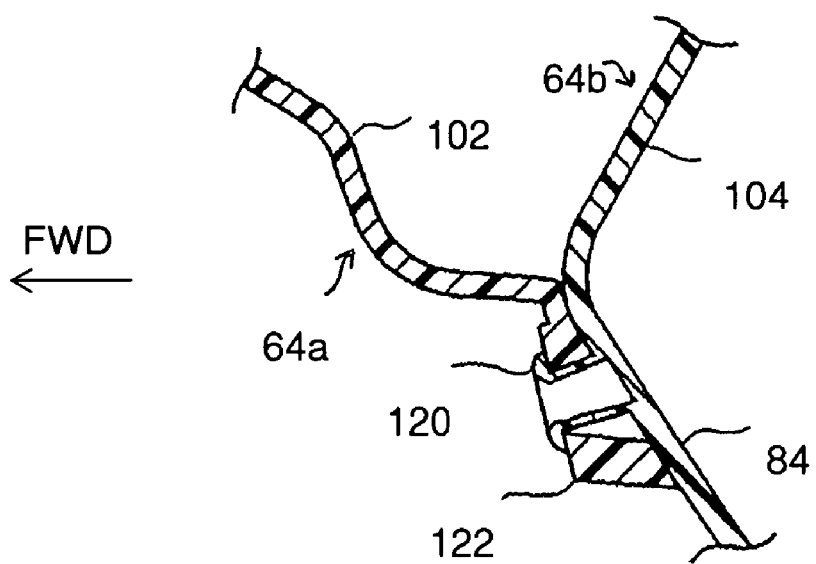
FIG. 7 illustrates a cross-sectional view of the leg shield taken along the line 7-7 of FIG. 5.

With reference to FIGS. 6 and 7, the upper member 64a and the lower member 64b preferably are coupled with each other. Because the upper member 64a is preferably made of ABS resin which is somewhat brittle, coupling structures that need relatively strong force are not suitable. In the illustrated preferred embodiment, the upper and lower members 64a, 64b are preferably welded each other. Because no strong force is necessary, the coupling structures using the welding are not easily breakable.

With reference to FIG. 6, a portion of the upper member 64a on the longitudinal center plane LCP preferably includes a bottom end 112 that has a relatively small flat area. A portion of the lower member 64b also on the longitudinal center plane LCP preferably includes a hook projection 114. The hook projection 114 engages the bottom end 112 of the upper member 64a. The hook projection 114 is sized and configured such that a strong force is required to engage the projection 114 with the bottom end 112. In addition, the portion of the upper member 64a preferably includes a boss 116, and the portion of the lower member 64b preferably includes a columnar projection 118. The columnar projection 118 is inserted into the boss 116. Then, a tip end of the columnar projection 118 is melted. Thus, the columnar projection 118 is securely welded to the boss 116.

With reference to FIG. 7, another portion of the lower member 64b at a location at which each pocket 100 is located preferably includes another columnar projection 120. The columnar projection 120 extends forward from an area of the lower slanting portion 84. The area is located adjacent to a border between the lower slanting portion 84 and the rear wall 104. A bottom of the upper member 64a that defines the bottom wall 102 includes a boss 122 in the area of the lower slanting portion 84. The columnar projection 120 is inserted into the boss 122. Then, a tip end of the columnar projection 120 is melted. Thus, the columnar projection 120 is securely welded to the boss 122.

Additionally, the illustrated leg shield 64 includes a hook 126 on the ridgeline of the swelling portion 90 above the pockets 100. Preferably, the hook 126 extends from the upper member 64a. The rider may hang an article(s) that has a string or an aperture on the hook 126.

Figure 8:
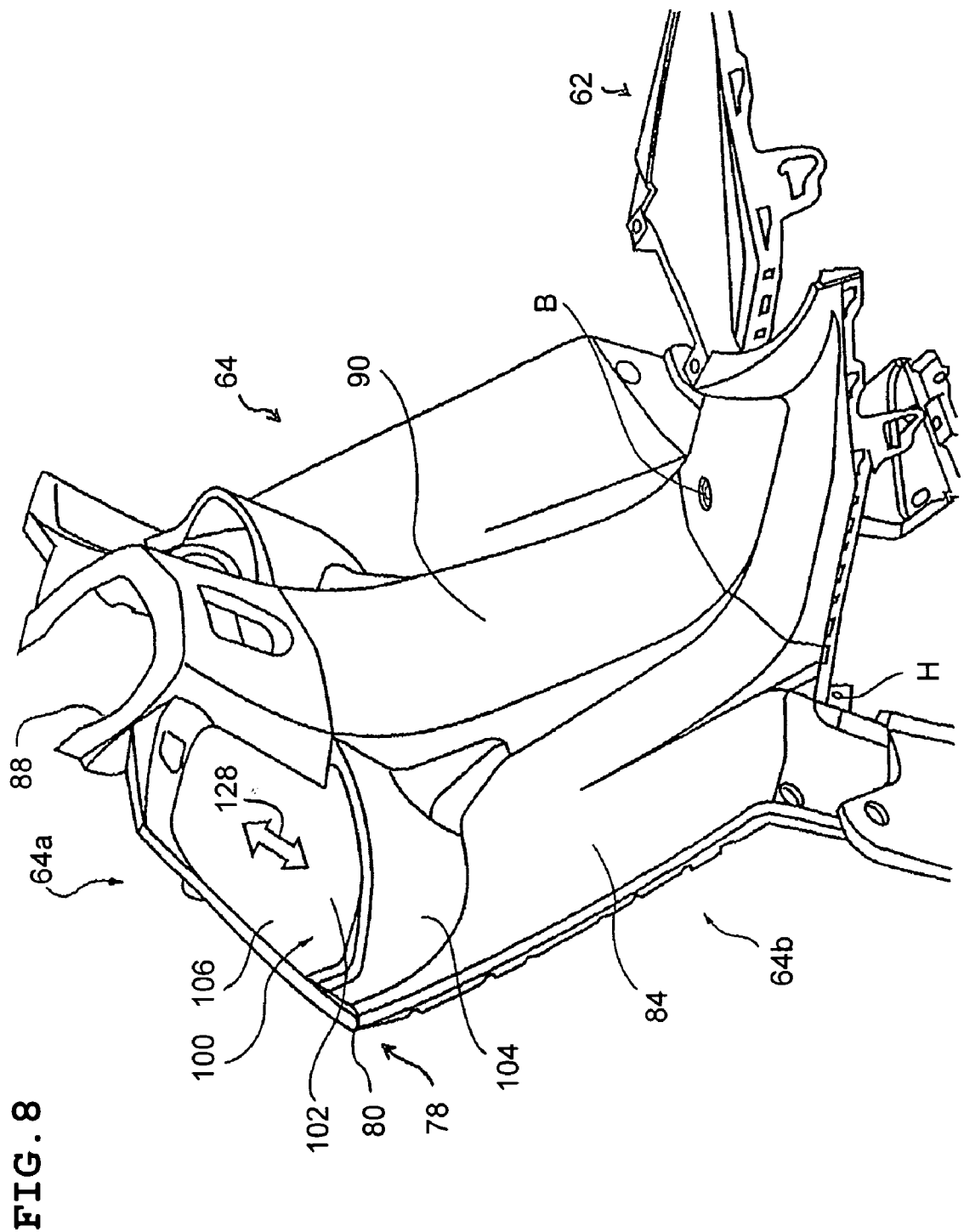
FIG. 8 illustrates another perspective view of the leg shield and the center cover as seen from a rear left side of the moped.

As best shown in FIG. 8, the rider (or riders) may store articles within the pockets 100. That is, the rider puts the articles into the pockets 100 and takes out the articles from the pockets 100 as indicated by the arrow 128 of FIG. 8.

As described above, the pockets 100 in the illustrated preferred embodiment are preferably located at the curved portion 78. Thus, the pockets 100 have a relatively large capacity for articles. In addition, each rear wall 104 in the illustrated preferred embodiment extends upward and rearward and has the arcuate curve. This configuration and arrangement further increases the capacity of the pockets 100. Also, because the illustrated rear walls 104 extend rearward, an area of the opening 108 is large enough to enable the rider to put the articles into the pockets 100 and take the articles out from the pockets 100. The rear walls 104, however, are not necessarily inclined rearward and do not necessarily have the arcuate curve. Although having a relatively large capacity, the pockets 100 in the illustrated preferred embodiment do not interfere with the rider because the entire body of the rear wall 104 is located farther forward than the rear end 94. Also, since the pockets 100 are disposed farther forward than the rear end 94, the pockets 100 do not adversely affect the appearance of the moped 30.

Figure 9:
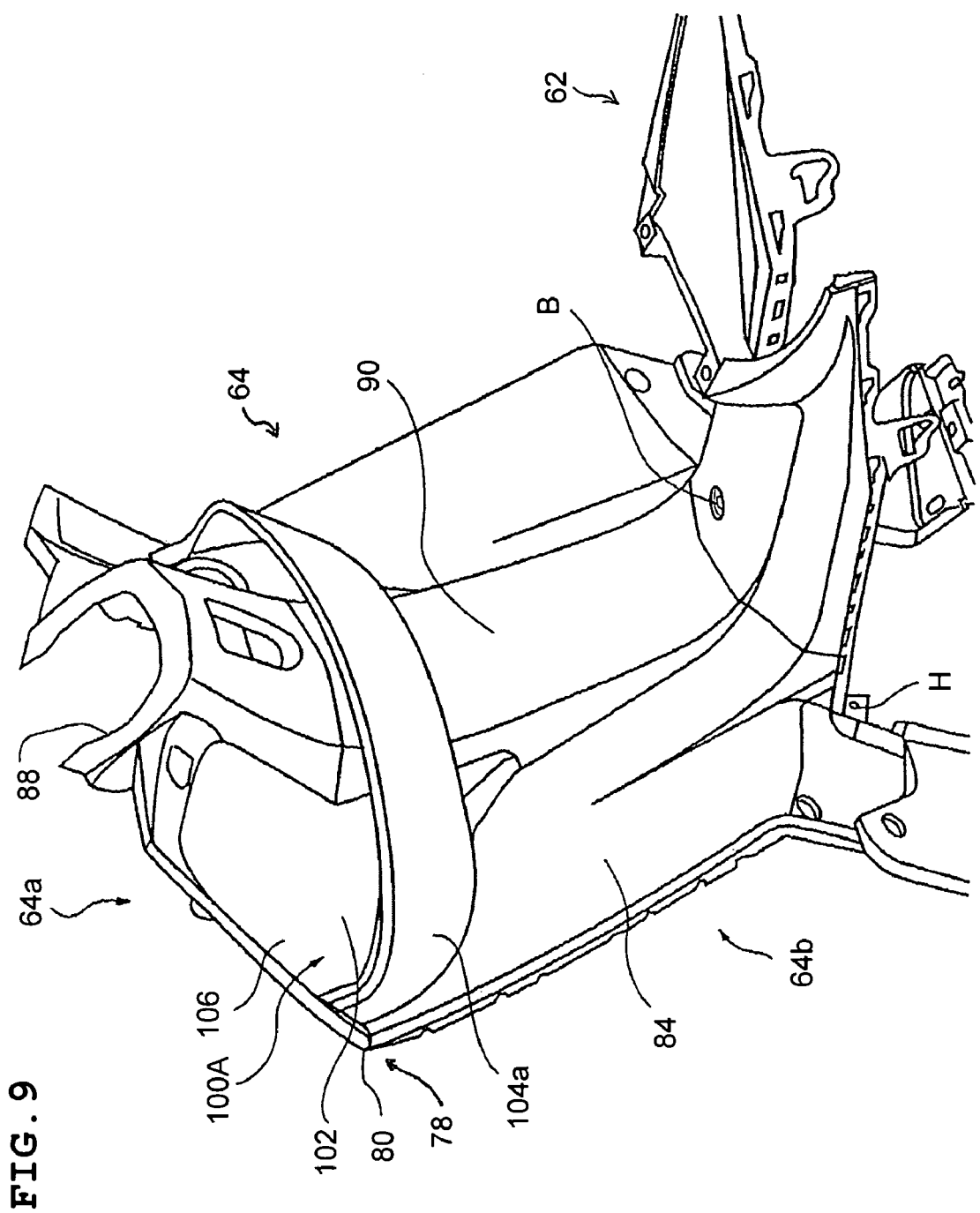
FIG. 9 illustrates a variation of the leg shield of FIG. 3.

The moped 30 may include a single pocket on either side of the swelling portion 90. Also, the pockets 100 described above may be coupled with each other to define a single pocket. FIG. 9 shows an alternative pocket 100A. The rear walls 104 of the pockets 100 are connected to each other to form a single rear wall 104A. The rear wall 104A surrounds the swelling portion 90. Preferably, the rear wall 104A is located adjacent to the rear portion of the rear end 94. Because of this arrangement, the pocket 100A has a capacity that is greater than that of the pockets 100. In addition, the pocket 100A does not interfere with the rider.

The leg shield 64 may include a single member or may include three or more members. For instance, the upper and lower slanting portions 82, 84 may be defined by a single member and the rear walls 104 of the pockets 100 may be defined by another members. Additionally, the leg shield 64 may be made of other resins or can be made of other materials such as, for example, a metal.

Although this invention has been disclosed in the context of certain preferred embodiments, it will be understood by those skilled in the art that the present invention extends beyond the specifically disclosed preferred embodiments to other alternative embodiments and/or uses of the invention and obvious modifications and equivalents thereof.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

What is claimed is:

1. A vehicle comprising:
   front and rear wheels;
   a frame arranged to support the front and rear wheels; and
   a leg shield arranged to shield the legs of a rider, a portion of the frame extending in front of the leg shield, the leg shield having a forward end and a rear end, the rear end being located at approximately the same height as the forward end; wherein
   the leg shield includes a first portion extending upward and rearward from the forward end, a second portion extending downward and rearward from the forward end, and at least one third portion extending upward and rearward from the second portion;
   the first and second portions together define a swelling portion extending rearward, and a ridgeline of the swelling portion defines the rear end; and
   the at least one third portion defines at least one pocket together with at least one of the first portion and the second portion, and the entire at least one third portion is located further forward than the rear end of the leg shield.

2. The vehicle as set forth in claim 1, wherein the at least one pocket includes a top end located at substantially the same height as the height of the forward end.

3. The vehicle as set forth in claim 1, wherein the first and second portions together define a recess extending rearward, the recess accommodates the portion of the frame extending in front of the leg shield, and the at least one third portion is located next to the recess.

4. The vehicle as set forth in claim 1, wherein the at least one third portion includes a pair of said third portions and the at least one pocket includes a pair of pockets, each of the pair of third portions extends from the second portion on each side of the swelling portion, and each of the pair of third portions defines one of said pair of pockets.

5. The vehicle as set forth in claim 1, wherein the leg shield includes first and second members, the first member defines the first portion and a top portion of the second portion, the second member defines a remaining portion of the second portion and the at least one third portion.

6. The vehicle as set forth in claim 5, wherein at least a portion of the first and second members are welded together.

7. The vehicle as set forth in claim 1, further comprising a hook disposed on an upper portion of the ridgeline of the swelling portion.

8. The vehicle as set forth in claim 4, wherein the pair of pockets are disposed so as to be substantially symmetrical with respect to a longitudinal center plane of the vehicle.

9. A vehicle comprising:
   front and rear wheels;
   a frame arranged to support the front and rear wheels; and
   a leg shield arranged to shield the legs of a rider, a portion of the frame extending in front of the leg shield; wherein
   the leg shield includes a curved portion that projects forward, the leg shield includes at least one pocket on a backside thereof which is opposite to a front side of the leg shield facing the portion of the frame, and the at least one pocket opens upwardly at substantially the same height as the curved portion.

10. The vehicle as set forth in claim 9, wherein the leg shield further comprises a first slanting portion extending upward and rearward from the curved portion, a second slanting portion extending downward and rearward from the curved portion, and an upward portion extending upwardly from the second slanting portion, the upward portion defining the pocket together with at least one of the first and second slanting portions.

11. The vehicle as set forth in claim 9, wherein the leg shield further comprises a swelling portion that swells in a rearward direction.

12. The vehicle as set forth in claim 11, wherein the swelling portion is located approximately on a longitudinal center plane of the vehicle that extends vertically and from front to rear.

13. The vehicle as set forth in claim 11, wherein the upward portion is located further forward than a ridgeline of the swelling portion.

14. The vehicle as set forth in claim 11, wherein at least a portion of the upward portion is located rearward of the swelling portion.

15. The vehicle as set forth in claim 11, further comprising a hook disposed on an upper portion of swelling portion.

16. The vehicle as set forth in claim 9, wherein the at least one pocket includes a pair of pockets that are disposed so as to be substantially symmetrical with respect to a longitudinal center plane of the vehicle.

17. The vehicle as set forth in claim 1, wherein the ridgeline of the swelling portion extends substantially along a longitudinal center plane of the vehicle.

\* \* \* \* \*